Patented Dec. 4, 1945

2,390,099

UNITED STATES PATENT OFFICE 2,390,099

CHEMICAL PROCESS

Jesse Harmon, Wilmington, Del., assignor to E. I. du Pont de Nemours & Company, Wilmington, Del., a corporation of Delaware No Drawing. Application May 22, 1942, Serial No. 444,111

15 Claims. (Cl. 260—609)

This invention relates to a telomerization process for the production of thioethers from ethylene and sulfhydryl compounds, especially hydrogen sulfide.

The processes of the prior art for the production of mercaptans and thioethers from olefins and hydrogen sulfide or mercaptans may be classified and described as follows: (1) The reaction of olefins with hydrogen sulfide to form mercaptans having the same number of carbon atoms as the original olefin, and (2) the reaction of mercaptans of type R—S—H with olefins resulting in the formation of thioethers of the type R—S—R' where R' contains the same number of carbon atoms as the olefin. Catalysts such as sulfuric acid, fuller's earth, or metallic sulfides have been used and the process has been carried out in the vapor phase or in the liquid phase at temperatures up to 500° C. Usually the pressures involved have not been specified, but, in one or two instances, it has been reported that pressures above 3500 pounds per square inch (234 atmospheres) favor undesirable side reactions.

It has previously been discovered that, under the proper reaction conditions, ethylene will react with certain compounds such, for example, as carbon tetrachloride, to produce hydrocarbon chains having a multiple of two carbon atoms and having portions of the second compound attached to the ends of the chains. The reaction has been called "telomerization" (from Greek telos, meaning "end" plus Greek mer meaning "part"). "Telomerization" is defined as the process of reacting, under polymerization conditions, a molecule YZ which is called a "telogen" with more than one unit of a polymerizable compound having ethylenic unsaturation called a "taxogen" to form products called "telomers" having the formula Y(A)$_n$Z wherein (A)$_n$ is a divalent radical formed by chemical union with the formation of new carbon bonds of $n$ units of the taxogen. The unit A is called a "taxomon", $n$ is any integer greater than one, and Y and Z are fragments of the telogen attached to the terminal taxomons.

It is an object of this invention to produce telomers from ethylene and sulfhydryl compounds. Another object is to produce thioethers from ethylene and sulfhydryl compounds wherein at least one alkyl radical of the thioether contains a multiple of the ethylene unit. Other objects will appear hereinafter.

It has now been found that these objects can be accomplished by reacting ethylene with sulfhydryl compounds of the group consisting of hydrogen sulfide, methyl mercaptan, and ethyl mercaptan at pressures above about 500 atmospheres and at temperatures of about between 120° C. and 200° C.

The reaction is conveniently carried out by introducing the liquid and/or solid constituents of the reaction mixture into a stainless steel-lined pressure vessel. The vessel is closed, evacuated to about 3 mm. of mercury pressure, cooled with ice water, mounted on a scale, and then charged directly from a storage cylinder with the required weight of sulfhydryl compound, e. g., hydrogen sulfide. The vessel is then mounted in a shaker machine, connected with a 1000 atmosphere ethylene supply system, and sufficient ethylene is added to give approximately the desired total pressure at the desired reaction temperature. The shaker machine is started, the pressure vessel is heated externally to the desired temperature, and additional ethylene is admitted, if necessary, to build up the pressure to the desired value. Temperatures both inside and outside of the vessel are measured by means of thermocouples and the temperature, pressure, and time data are recorded as the reaction proceeds. The reaction proceeds with a decrease in pressure due to the interaction of the ethylene with the sulfhydryl compound, but the total pressure in the system is maintained by pumping in more ethylene as required. In some cases, it is necessary to reduce the applied heat in order to compensate for the heat of the reaction when it is vigorously exothermic. When the reaction is complete, as is indicated by the cessation of ethylene absorption, heating is discontinued, and, after the vessel is cold, the excess gases are bled off, the vessel opened, and the contents discharged.

The reaction in the case of ethylene and hydrogen sulfide is expressed by the following equations:

$$CH_2=CH_2+H_2S \rightarrow CH_3CH_2SH$$

$$nCH_2=CH_2+CH_3CH_2SH \rightarrow H(CH_2CH_2)_nSCH_2CH_3$$

wherein $n$ is an integer greater than one. Generally, a mixture of products differing in the value of $n$ is obtained. Some polyethylene and

$$CH_3CH_2SCH_2CH_3$$

may be formed as by-products.

The procedures for isolation and purification of the products are more fully described in the following examples which are given by way of illustration. The invention is not limited to the specific examples, but suitable variations may be made which will become apparent hereinafter. In the examples, parts are given by weight unless otherwise stated.

EXAMPLE I

A stainless steel-lined reaction vessel is charged to about two-fifths of its capacity with 150 parts of water, the pH of which has been adjusted to 2.30 with hydrochloric acid, and 20 parts of hydrogen sulfide. The vessel is connected to an ethylene compressor and heated with agitation at 198–201° C. under 850–940 atmospheres combined ethylene-hydrogen sulfide pressure for 10.5 hours. The pressure drop during this time is 310 atmospheres. The reaction product consists of two liquid layers, the upper of which is organic in nature. This upper layer is separated from the aqueous layer, dried, and fractionally distilled. Fourteen (14) parts of diethyl sulfide boiling at 90–92° C., 2 parts of a thioether boiling at 92–142° C. (containing butyl ethyl sulfide), and 2 parts of a higher boiling thioether are obtained.

EXAMPLE II

A pressure vessel is charged, as in Example I, with 100 parts of water, the pH of which has been adjusted to 1.70. The vessel (about ¼ full) is closed and charged with 80 parts of hydrogen sulfide, mounted on a shaker machine, and heated at 163–189° C. in the presence of sufficient ethylene to maintain the total pressure at 700–900 atmospheres. The total pressure drop due to the reaction of the gases is 1595 atmospheres during a period of 11 hours. The reaction mixture consists of two layers. The upper organic layer is separated, washed with water, dried, and fractionally distilled. The following fractions are obtained:

*Fractions*

1. B. P. 30–90° C. (mostly at 35° C.), 21 parts _____ Ethyl mercaptan
2. B. P. 90–92° C., 99 parts _____ Diethyl sulfide
3. B. P. 100–140° C., 1.2 parts _____ A mixture of organic sulfides
4. B. P. 140–142° C., 2 parts _____ Butyl ethyl sulfide
5. Residue, 4.5 parts The fractions boiling higher than diethyl sulfide from a number of runs made in accordance with the above procedure amounted to 78 parts. This material is fractionally distilled and the following products obtained:

*Fractions*

1. B. P. 84–93° C./760 mm., 5 parts __ Diethyl sulfide
2. B. P. up to 50° C./30 mm., 3.5 parts _____ A mixture
3. B. P. 50–52° C./30 mm., 37.5 parts _____ n-Butyl ethyl sulfide
4. B. P. 52–108° C./27 mm., 10 parts _____ Pale yellow liquid
5. B. P. 108–109° C./27 mm., 10 parts _____ Ethanedithiol diethyl ether
6. Residue, 12 parts _____ Medium viscosity amber colored oil Fraction 3 is oxidized in glacial acetic acid with 30 per cent hydrogen peroxide, and a white crystalline product melting at 50–51° C. is obtained. A mixed melting point with an authentic specimen of n-butyl ethyl sulfone was also 50–51° C.; thus, fraction 3 is identified as n-butyl ethyl sulfide. Likewise, fraction 5 is oxidized with hydrogen peroxide and a white crystalline product which melts at 135.5–136.5° C. is obtained. A mixed melting point with an authentic specimen of the sulfone of ethanedithiol diethyl ether is not depressed which proves that fraction 5 is ethanedithiol diethyl ether.

EXAMPLE III

A pressure vessel is charged as in Example I with a solution consisting of 176 parts of water and 11.3 parts of sodium hydrosulfide and 10 parts of carbon tetrachloride. The vessel is closed and heated with agitation at 115–122° C. under 870–940 atmospheres of ethylene pressure for 11 hours during the first 9.5 hours of which a pressure drop of 95 atmospheres of ethylene is observed. The vessel is cooled and the reaction mixture is discharged. The crude product is a water-insoluble oil with a very pronounced mercaptan odor and amounts to 3 parts. By distillation under reduced pressure, 1 part of this distills at 94–130° C. at 15 mm. of mercury pressure. By sodium fusion analysis, this product is shown to contain sulfur, but no chlorine. This product is treated with 2,4-dinitrophenylchloride by the method of Bost, Turner, and Norton (J. Am. Chem. Soc. 54, 1985 (1932)), but no 2,4-dinitrophenyl sulfide could be obtained. It is proved, therefore, that the product is not a mercaptan, but a thioether instead. The residue which boils above 130° C./15 mm. is a black oil of low viscosity.

EXAMPLE IV

A stainless steel-lined pressure vessel is evacuated to about 15 mm. of mercury pressure and then charged with 40 parts of hydrogen sulfide. It is connected with an ethylene compressor and heated with agitation at 175–182° C. under 605–945 atmospheres of combined hydrogen sulfide-ethylene pressure for 10.5 hours. The observed total pressure drop during the first 8 hours is 435 atmospheres and, during the last 2.5 hours, it is only 10 atmospheres. The vessel is cooled and found to contain 53 parts of a liquid with a mercaptan odor. This product is fractionally distilled and 4 parts of butyl ethyl sulfide boiling at 141–142° C. and 2 parts of higher boiling dialkyl sulfide are obtained.

Sulfhydryl compounds which are suitable for the present invention include hydrogen sulfide, methyl mercaptan, and ethyl mercaptan. While no attempt is made to explain the theory of the process, it appears that, when hydrogen sulfide is used as the telogen, ethyl mercaptan is one intermediate product; see Example II. Hydrogen sulfide is the preferred telogen.

In place of using an organic sulfhydryl compound as a telogen, compounds may be used which, under the conditions of the reaction, will supply the sulhydryl compounds. For example, water-soluble hydrosulfides of alkali and alkaline earth metals may be used (Example III). In fact, any substance which is capable of liberating hydrogen sulfide, methyl mercaptan, or ethyl mercaptan under reaction conditions is suitable as a raw material for the process.

The process of this invention may be carried out in the absence or presence of solvents or diluents. Water and ethyl alcohol are good examples of satisfactory solvents, water being especially suitable due to the ease of separation of water from the products of the reaction. Moreover, the water may serve to react with other substances to generate the sulfhydryl compounds which are to be used as telogens under the conditions of the reaction.

Pressures of about 500 atmospheres or above are required for the process of this invention, as, at lower pressures, the simple addition of the sulfhydryl compound to the olefin is the exclusive reaction and falls outside the scope of the present invention. Pressures as high as 1000 atmospheres are quite satisfactory, but the ultimate pressure which can be used is limited only by the mechanical strength of the equipment available. Pressures of about 800 to 1000 atmospheres are preferred because of increased yields. Temperatures in the range of about 120–200° C. are operable and 160–185° C. is the preferred range. The temperature must be high enough to be favorable for telomerization, but not so high as to cause cracking or thermal decomposition of the reactants or products (i. e., not above about 200° C.).

Catalysts such as the sulfides of copper, zinc, lead, nickel, and iron may be used, but these are not required for the practice of the invention. Molecular oxygen in small amounts may catalyze the reaction. It is also advantageous, though not essential, to carry out the process in a mildly acid medium, such as water made acid with hydrogen chloride or any other non-oxidizing acid to a pH in the range of 1.5–3.0.

The process of this invention produces thioethers (dialkyl sulfides) of the formula R—S—R' wherein R and R' are alkyl radicals and at least one of them contains more than two carbon atoms. Where the telomerization reaction is carried out with ethylene and hydrogen sulfide as the telogen, the tolomerization products are primarily compounds of the formula

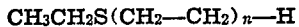
$$CH_3CH_2S(CH_2-CH_2)_n-H$$

where $n$ is an integer greater than unity and, in general, is an integer from 2 to 6. These thioethers are useful in the rubber, cosmetic, and pharmaceutical industries; as solvents; and as intermediates in the production of sulfoxides, sulfones, and sulfonium compounds which are useful as plasticizers, surface-active agents, extile assistants, etc.

It is apparent that many widely different embodiments of this invention may be made without departing from the spirit and scope thereof, and, therefore, it is not intended to be limited except as indicated in the appended claims.

I claim:

1. A process which comprises reacting ethylene and a sulfhydryl compound of the group consisting of hydrogen sulfide, methyl mercaptan, and ethyl mercaptan at a pressure of at least 500 atmospheres and a temperature of about 120° C. to 200° C.

2. A process which comprises reacting ethylene in the presence of water with a sulfhydryl compound of the group consisting of hydrogen sulfide, methyl mercaptan, and ethyl mercaptan at a pressure of at least 500 atmospheres and a temperature of about 120° C. to 200° C.

3. A process which comprises reacting ethylene in the presence of water with a sulfhydryl compound of the group consisting of hydrogen sulfide, methyl mercaptan, and ethyl mercaptan at a pressure of about 800 to 1000 atmospheres and a temperature of about 160° C. to 185° C.

4. A process which comprises reacting ethylene with hydrogen sulfide at a pressure of at least about 500 atmospheres and a temperature of about 120° C. to 200° C.

5. A process which comprises reacting ethylene with hydrogen sulfide at a pressure of at least about 500 atmospheres and a temperature of about 160° C. to 185° C.

6. A process which comprises reacting ethylene with hydrogen sulfide in the presence of water at a pressure of about 800 to 1000 atmospheres and a temperature of about 160° C. to 185° C.

7. A process which comprises reacting ethylene with hydrogen sulfide in the presence of an aqueous medium having a pH of 1.5 to 3.0 at a pressure of about 800 to 1000 atmospheres and a temperature of about 160° C. to 185° C.

8. A process which comprises reacting ethylene with ethyl mercaptan at a pressure of at least about 500 atmospheres and a temperature of about 120° C. to 200° C.

9. A process which comprises reacting ethylene with ethyl mercaptan at a pressure of at least about 500 atmospheres and a temperature of about 160° C. to 185° C.

10. A process which comprises reacting ethylene with ethyl mercaptan in the presence of water at a pressure of about 800 to 1000 atmospheres and a temperature of about 160° C. to 185° C.

11. A process which comprises reacting ethylene with ethyl mercaptan in the presence of an aqueous medium having a pH of 1.5 to 3.0 at a pressure of about 800 to 1000 atmospheres and a temperature of about 160° C. to 185° C.

12. A process which comprises reacting ethylene with methyl mercaptan at a pressure of at least about 500 atmospheres and a temperature of about 120° C. to 200° C.

13. A process which comprises reacting ethylene with methyl mercaptan at a pressure of at least about 500 atmospheres and a temperature of about 160° C. to 185° C.

14. A process which comprises reacting ethylene with methyl mercaptan in the presence of water at a pressure of about 800 to 1000 atmospheres and a temperature of about 160° C. to 185° C.

15. A process which comprises reacting ethylene with methyl mercaptan in the presence of an aqueous medium having a pH of 1.5 to 3.0 at a pressure of about 800 to 1000 atmospheres and a temperature of about 160° C. to 185° C.

JESSE HARMON.